June 8, 1965  S. A. YOST ETAL  3,187,907
TRANSPORTING AND ELEVATING TRAILER
Filed April 11, 1962  3 Sheets-Sheet 1

INVENTORS:
Stanley A. Yost
Anthony Toth

By Willard M. Graham
Agent

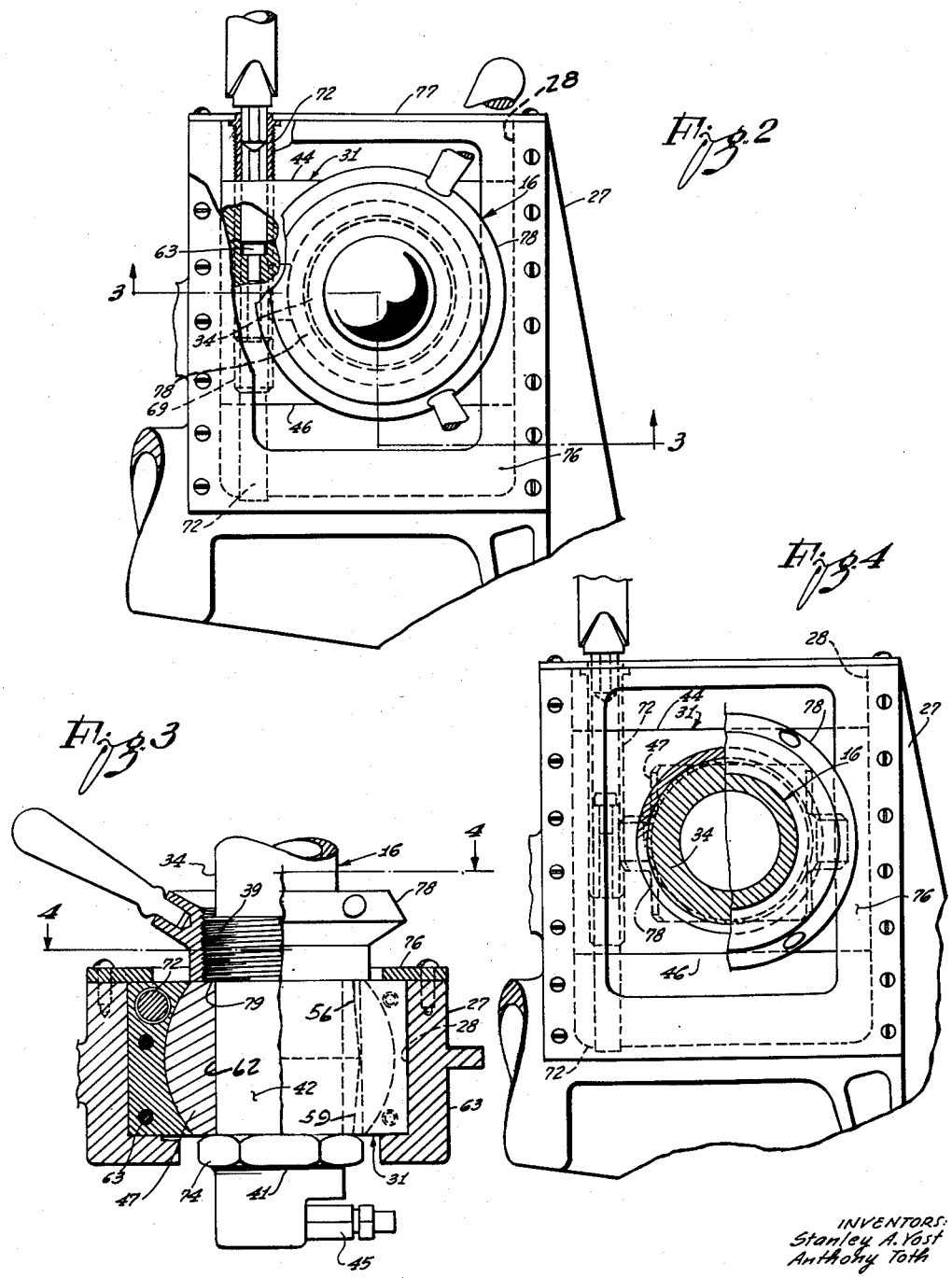

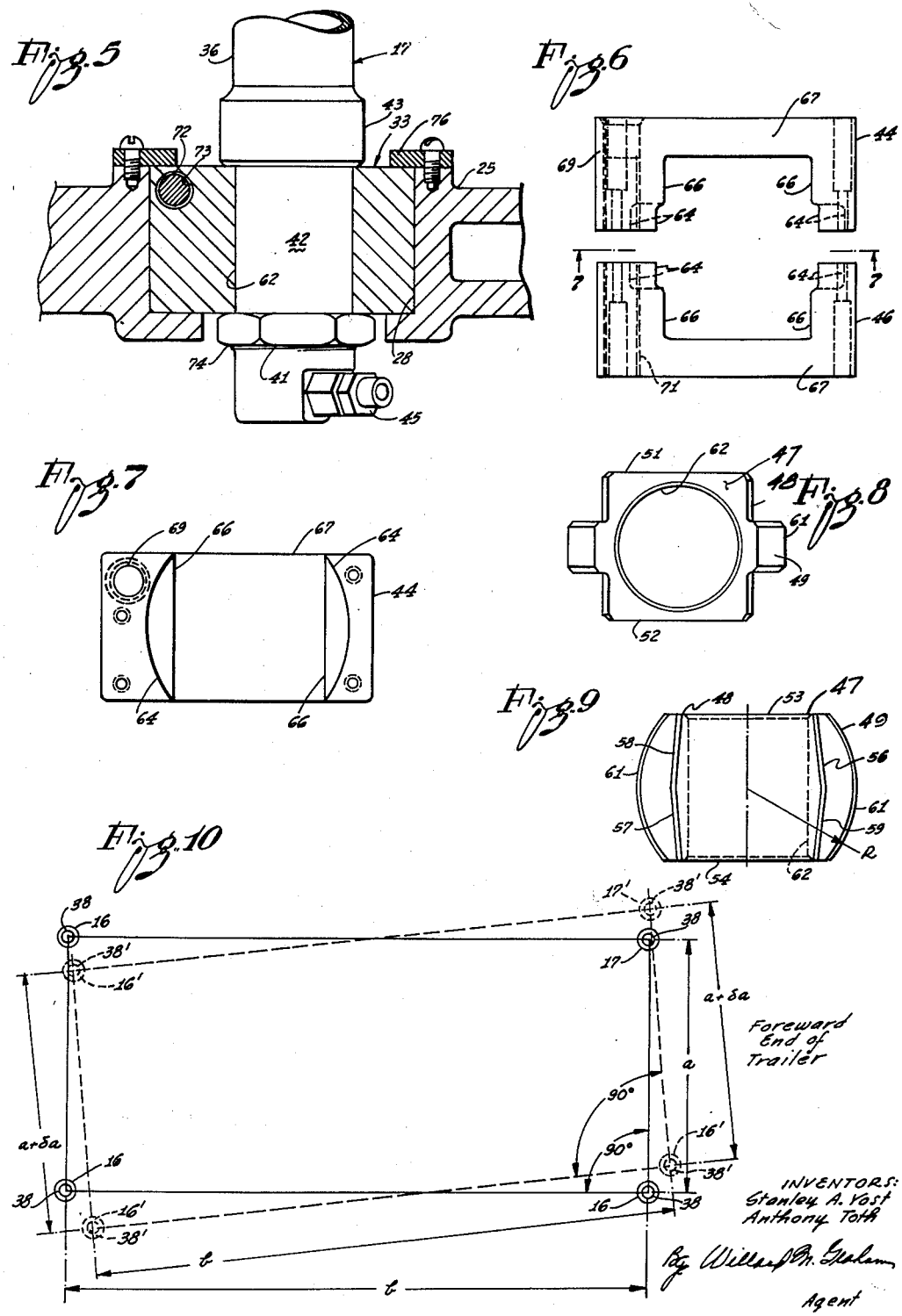

United States Patent Office 3,187,907
Patented June 8, 1965

3,187,907
TRANSPORTING AND ELEVATING TRAILER
Stanley A. Yost, Inglewood, and Anthony Toth, Gardena, Calif., assignors to Northrop Corporation, Beverly Hills, Calif., a corporation of California
Filed Apr. 11, 1962, Ser. No. 186,779
3 Claims. (Cl. 214—1)

This invention relates to material handling equipment and more particularly to an elevating and transportation trailer having utility in the handling and positioning of relatively light aircraft components. This application is a continuation-in-part of application Serial No. 739,038, filed June 2, 1958, now abandoned.

The trailer as disclosed herein is of relatively light construction and is especially designed to fill a void currently found in trailer or dolly design. The instant trailer also incorporates new and novel features which are not found in present trailer construction.

Accordingly it is an object of this invention to provide an elevating and transportation trailer having vertically mounted jacks on which components to be carried by the trailer may be directly supported.

Another object is to provide an elevating and transportation trailer adapted to impart linear yaw, pitch and roll movements to components mounted thereon.

Another object is to provide a multi-purpose elevating and transportation trailer which is light in weight, simple in design, rugged in construction, which is economical to manufacture and which may be easily adapted for each purpose desired.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 2 is an enlarged plan view of one of the adjustable support assemblies of the trailer as indicated by the letter A in FIGURE 1, parts of the view being broken away to better show the internal construction thereof.

FIGURE 3 is a sectional view of the support assembly taken on the line 3—3 of FIGURE 2.

FIGURE 4 is a sectional view of the entire support assembly taken on the line 4—4 of FIGURE 3.

FIGURE 5 is a sectional view similar to FIGURE 3 showing the construction of the non-pivotal support assembly of FIGURE 1.

FIGURE 6 is a plan view of the yoke members constituting components of the support assembly shown in FIGURES 2, 3 and 4.

FIGURE 7 is a view of the yoke members as indicated by the arrows 7—7 in FIGURE 6.

FIGURES 8 and 9 are plan and elevational views, respectively, of the pivotal member shown in FIGURE 3.

FIGURE 10 is a diagrammatic plan view of the trailer of FIGURE 1 illustrating how it functions in effecting a yawing operation.

Figure 1:
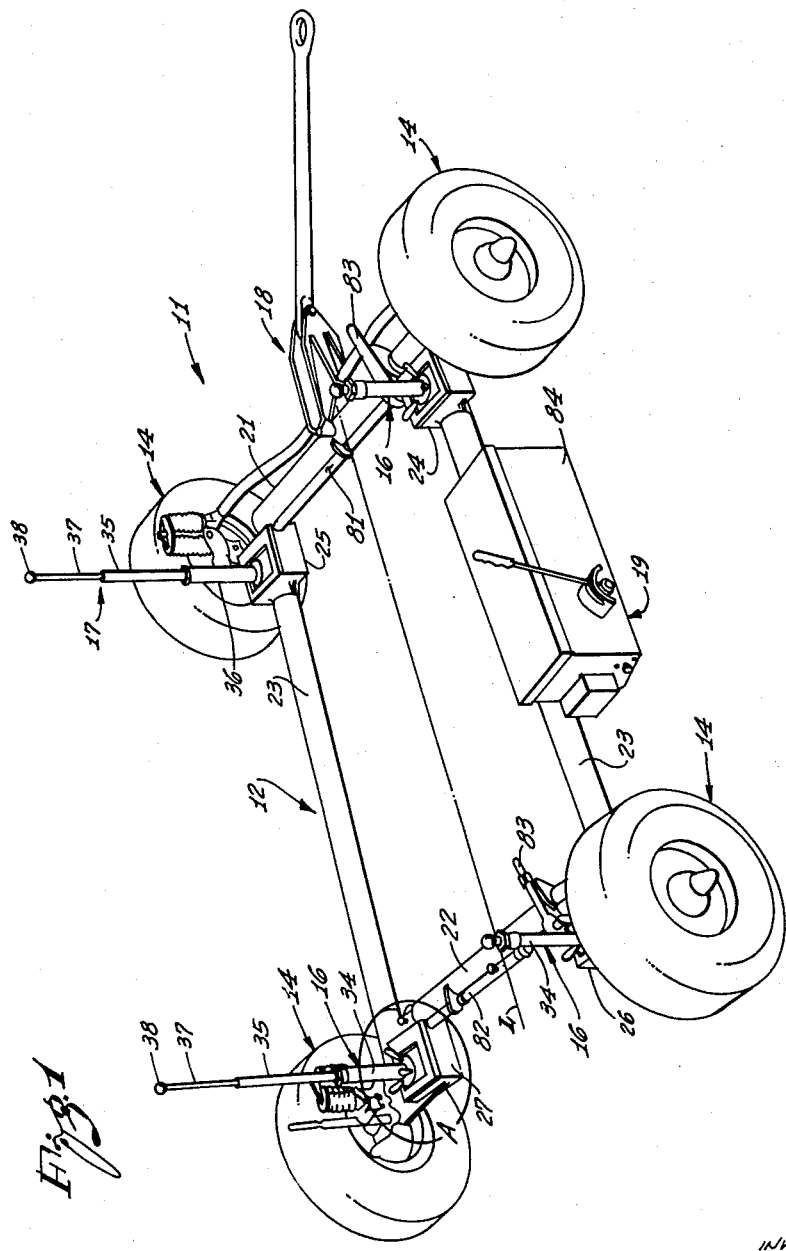
FIGURE 1 is a perspective view of the elevating and transportation trailer as disclosed herein.

Referring now to the drawings, FIGURE 1 shows an elevating and transportation trailer as disclosed herein indicated in its entirety by the numeral 11. The trailer consists of a frame assembly 12 of rectangular configuration having a wheel assembly 14 mounted at each corner thereof, pivotal and non-pivotal support assemblies 16 and 17, respectively, a tow bar assembly 18 and hydraulic apparatus 19 adapted to supply pressurized fluid to the support assemblies.

The frame assembly 12 includes fore and aft elongated members 21 and 22, respectively, and side members 23—23 which are also elongated. The frame members are secured together by corner castings 24, 25, 26, and 27, to impart to the frame assembly the aforementioned rectangular configuration, when viewed in plan as shown in FIGURE 1, and maintain the members in a coplanar relation when viewed in elevation.

The wheel assemblies 14 are mounted on the castings 24, 25, 26, and 27 to render the trailer mobile and support the members 21, 22, and 23. It will also be seen that the assembly 12 is symmetrically constructed about a longitudinal axis "L."

The forward wheel assemblies are attached to the tow bar assembly 18 by tie rods which enable the trailer to be guided in a conventional manner. Each of the wheel assemblies 14 are mounted on their respective corner castings for pivotal movement about a vertical axis. Accordingly the wheels of the assemblies 14 may be turned through an angle of 90° with respect to their positions shown in FIGURE 1, and locked in the latter position. This feature allows the trailer to be moved in a lateral direction and accordingly provides means whereby lateral movement may be imparted to components supported on the trailer. This feature, however, is not novel insofar as the instant trailer is concerned, accordingly a detailed description of this feature is not deemed necessary.

Each of the castings 24, 25, 26, and 27 has a passage or guideway 28 which extends laterally of the trailer as shown in FIGURES 2, 3 and 4. The guideways 28 are adapted to receive block means utilized to mount the support assemblies 16 and 17 on the frame assembly 12 in a manner presently explained.

The support assemblies 16, shown in FIGURES 1, 2, 3, and 4, include cylindrical members 34, 35, and 37 and block means 31 while the assembly 17, shown in FIGURE 5, includes cylindrical members 36, 35, and 37 and block means 33. The block means 31 mounts the members 34, 35 and 37 on the frame assembly 12 for angular and linear movement while the block means 33 mounts the members 36, 35 and 37 on the frame assembly for linear movement only.

The support assemblies 16 and 17 are of similar construction with the exception of the lowermost or attaching members 34 and 36, respectively. The assemblies 16 and 17 are of telescopic construction and function to elevate components mounted thereon. The outermost members 37 of each support assembly terminate in a spherical load supporting bearing 38 as shown in FIGURE 1.

The cylindrical members 34 of the assemblies 16 are characterized by having two sets of spaced threads 39 and 41 adjacent their closed end and a cylindrical bearing surface 42 located therebetween. The cylindrical member 36 of the assembly 17 is substantially of the same construction as the cylinders 34 except the set of threads 39 are replaced by an annular shoulder 43 the outside diameter of which is greater than the diameter of the bearing surface 42. Fitting and conduit means 45 are provided at the closed end of the cylinders 34 and 36 providing means whereby hydraulic fluid may be conducted from and to the assemblies 16 and 17.

The block means 31 consists of a pair of yoke members 44 and 46 (FIGURES 6 and 7) and a rotatable member 47 (FIGURES 8 and 9). The rotor member 47 is of block-like configuration and includes a body and arcuate portions 48 and 49, respectively. The body portion 48 includes a first set of parallel faces 51 and 52 and a second set 53 and 54, the two sets having a right angle relationship. Also the body portion includes two sets of faces 56–57 and 58–59 having a tapered relation with respect to the faces 53–54. The faces 56–57 have a parallel relation, as do the faces 58–59, and all these faces taper outwardly as they recede from the faces 53–54 to meet in an angular relation midway between the latter faces substantially as shown in FIGURE 9. The arcuate portion 49 is located midway between the faces 51 and 52 and its edge face 61 constitutes a partial spherical surface of radius R the center of which is located at the geometric center of the body portion 48. A cylindrical bore 62 is centrally located in the body portion 48, the axis of the bore having a normal relation with respect to the faces 53–54. The diameter of the bore 62 is such that it will snugly and firmly incase the portion 42 of the cylindrical member 36.

The outside configuration of the yoke members 44 and 46, when secured together by bolts 63 as best seen in FIGURE 2, constitute a structure the outside configuration of which is substantially rectangular. The outside measurements of the yoke members are such that they may be positioned in and have a sliding fit in the guideways 28 formed in the castings 24, 26 and 27. The inside of the yoke members, when secured together, are shaped to incase the rotatable member 47 as best seen in FIGURE 3. As assembled the cylindrical surface 61 of the member 47 mates with the cylindrical surface 64 formed in the yoke members 44 and 46. The surfaces 66 of the yoke members cooperate with the tapered surfaces 56–59 of the member 47 to limit pivotal movement of the assemblies 16. The surfaces 66 of the yoke members 44 and 46 have a normal relation with respect to the faces 67 of the yoke members and, therefore, allow limited angular movement of the member 47 in the yoke members 44 and 46.

In addition to the bores formed in the yoke members for receiving the bolts 63, threaded bores 69 are also provided therein for receiving a screw member 72 (FIGURE 2) which functions to move the assemblies 16 in the guideways 28 in a lateral direction with respect to the frame 12 of the trailer. For obvious reasons the threads in the bores 69 are formed after the yoke members are secured together.

The block means 33 constitutes a unitary block member having outside dimensions allowing it to be snugly but slideably incased in the guideway 28 provided in the casting 25. The block means 33 is of solid construction except for a cylindrical bore 62 and a threaded bore 73, the latter corresponding to the threaded bores 69 provided in the yoke members 44 and 46.

The support assembly 17 being mounted in the block means 33, the means 33 in turn is mounted in the guideway 28 formed in the casting 25 substantially as shown in FIGURE 5. So mounted the bearing portion 42 of the member 36 is positioned in the bore 62 and is rigidly held in this position by the nut 74 which engages the threads 41. It will now be apparent that the assembly 17 will be maintained in a vertical upright and fixed position on the block means 33. It should also be noted that the block means 33 is maintained in the guideway 28 by an upper apertured frame member 76 which is secured to the casting 25 by cap screws or the like.

The support assemblies 16, after they are mounted in their respective block means 31, are then mounted in the guideways 28 in the corner castings 24, 26 and 27. It will be noted that the block means 31 are also maintained in their respective guideways by upper apertured frame members 76 and end plates 77. An end plate (not shown), identical to the end plate 77, is also provided in connection with the casting 25 and functions to limit inboard movement of the block means 33.

By referring to FIGURES 2, 3 and 4 it will be seen that a hand nut 78 cooperates with the threads 39 formed on the lower end of the member 34. The threaded portion terminates in an annular shoulder 79 which bottoms on the surface 53 of the pivotal member 47 and surfaces 67 of the yoke members 44 and 46 as best seen in FIGURE 4. The bottoming of the hand nut 78 on the aforementioned surfaces, hereinafter referred to as the locked or bottomed position of the nut 78, precludes angular tilting movement of the pivotal member 47 in the block means 31 and locks the assembly 16 in an upright vertical position. At such times as the nuts 78 are backed off their bottomed position, hereinafter referred to as the unlocked position of the nut 78, the assemblies 16 are free to tilt within predetermined limits as previously explained. This tilting or angular movement is confined to planes parallel to a vertical plane containing the longitudinal axis "L" of the trailer. Further the extent of this tilting or angular movement is limited by the taper of the surfaces 56–59 of member 47 and the surfaces 66 of the yoke members 44 and 46. In the present embodiment the taper of the surfaces 56–59 is such that they allow the assemblies 16 to tilt through an angle of approximately five degrees (5°) on each side of their true vertical positions. Thus it will be seen that the three support assemblies 16 may be locked in their true vertical positions or rendered free to tilt within limits in fore and aft directions while the support assembly 17 remains fixed in a true vertical position at all times.

Linear movement of the support assemblies 16 and 17, laterally of the trailer 11, is initiated by a pair of conventional ratchet rod assemblies 81–82 located at the fore and aft ends of the trailer, respectively. Each end of the ratchet rod assemblies 81 and 81 includes rod members the ends of which are provided with hexagon shaped or like projections 80 as best seen in FIGURE 2. These end portions are received in hexagon shaped bores provided in the members 72, the latter members having external threads provided thereon adapted to mate with the threads in the bores 69 and 73. In this respect the threads on the members 72 are all right-hand threads. Ratchet mechanisms (not shown) are provided in the assemblies 81 and 82 and include a lever 83 whereby the rods comprising components of the latter assemblies may be rotated in either a clockwise or counter-clockwise direction. This rotational movement is simultaneously imparted to the screw members 72 located at the forward end of the trailer 11 causing the support assemblies 16 and 17 to simultaneously move laterally either to the right or to the left with respect to the frame assembly 12. It will also be apparent that upon actuation of the aft ratchet assembly 82 rotational movement will also be simultaneously imparted to the screw members 72 associated therewith causing the aft support assemblies 16 to simultaneously move either to the right or to the left with respect to the frame assembly 12.

The aforementioned hydraulic system 19 supplies pressurized fluid to and allows the return thereof from the support assemblies 16 and 17. The system 19 includes conventional actuation apparatus (not shown) housed in a container 84 secured to one of the frame members 23. The fluid conduits 45 (FIGURES 3 and 5) provide fluid paths between the actuating apparatus and the support assemblies 16 and 17 and for the most part are housed in the members 21, 22 and 23. The actuating apparatus consists of a conventional hand pump (not shown) and suitable valving whereby fluid may be directed simultaneously to all the support assemblies or to any two of the support assemblies not diagonally positioned with respect to each other. That is, fluid may be simultaneously directed to all four support assemblies, to the two forward support assemblies, to the two aft support assemblies, or the two support assemblies located on either the right or left side of the trailer 11.

In actual practice a component handling fixture (not shown), similar to the support fitting shown in U.S. Patent No. 2,896,909, is normally supported on the spherical bearings 38. A component handling fixture of the type referred to above incorporates means whereby yaw and roll movements may be imparted to components mounted therein, however, in the trailer as disclosed herein components may be supported directly on the spherical bearings 38 if suitable support sockets are provided on the components themselves. In the latter instance pitch, also limited yaw and roll movements, may be imparted to components in a manner presently explained in connection with the operation of the trailer 11.

The operation of the trailer will now be explained and the novel features thereof discussed by means of which yaw, pitch and roll movements may be imparted to components mounted thereon. Limited lateral movement may be imparted to components supported on the trailer by simultaneously rotating the fore and aft ratchet assemblies 81 and 82 in the same direction. In this instance, lateral movement is achieved due to the fact that the members 72 are rotated in their respective bores 69 and 73. It will also be apparent that lateral and longitudinal movements may be imparted to components supported on the trailer by physically moving the trailer as a unit either laterally or longitudinally on its wheel assemblies.

Pitch is imparted to components supported on the trailer by simultaneously directing pressurized fluid to or simultaneously allowing fluid to escape from either the fore or aft support assemblies. For purpose of illustration it is assumed that pitch is to be imparted to a component loaded on the trailer by extending the support assemblies 16 and 17 located at the forward end of the trailer. Prior to directing fluid to or withdrawing fluid from the forward assemblies 16 and 17, the hand nuts 78, associated with the aft assemblies 16, are backed away from their bottomed positions. Thus as the forward assemblies 16 and 17 are extended or retracted the aft assemblies 16 are free to tilt in angular planes, either in fore or aft directions, from their vertical positions within limits determined by the tapered surfaces 56–59. Thus it will be seen that the tiltable feature of the assemblies 16 provides means allowing the longitudinal distance between the spherical bearings 38 to remain constant during this operation. During this operation it will also be understood that the forward support assemblies are locked and remain in their true vertical positions.

Operational procedures to be followed in imparting yaw movements to components supported on the trailer 11 will best be understood by referring to FIGURE 10. In effecting this operation it will be assumed that yaw in a counter-clockwise direction is to be imparted to components mounted on the trailer 11. The hand nuts 78, associated with all of the support assemblies 16, are first backed away from their bottomed positions. In this respect it will be noted that left-hand support assembly 17 remains locked in its true vertical positions. Rotational movement in a direction causing the forward support assemblies 16 and 17 to simultaneously move to the left to new positions as indicated by dotted line construction and identified by the numerals 16¹ and 17¹ is now imparted to the forward ratchet assembly 81. Simultaneously or at a different time the aft ratchet assembly 82 is rotated in the opposite direction to that imparted to the assembly 81. This movement causes the aft support assemblies 16—16 to simultaneously move to the right to the new positions indicated by dotted line construction and identified by the numerals 16¹—16¹. The above described yawing movement imparted to components mounted on the trailer is due to the fact that right-hand threads are employed on both sides of the trailer 11.

In effecting the yawing movement described above it will be seen that a component handling fixture, or a component if mounted directly on the bearings 38, will pivot about the rigid support assembly 17. Also, during the above yawing movement, it will be seen that the tilting action of the support assemblies 16 allows the longitudinal distance "b" between the bearings 38 to remain constant. It is appreciated that the lateral distance "a" between the bearings 38 will tend to increase slightly as a yawing movement is imparted to a component mounted on the trailer. This tendency of the measurement "a" to increase is restrained by the rigid construction of the component handling fixture or of the component itself. This increase, however, will be quite small, in fact only a small increment of the lateral distance "a," and can be readily absorbed by the flexibility of the system, specifically by the flexibility of the assemblies 16 and 17. In this respect it should be understood that a yawing movement is utilized merely to bring a component into proper relation with supporting structure for securing purposes and, therefore, is employed only to remove exceedingly small angular differences.

Limited rolling movement may also be effected by the trailer 11 with or without a component handling fixture. For purposes of illustration it is assumed that rolling movement in a clockwise direction is to be imparted to a component mounted on the trailer. During this operation all of the hand nuts 78 are bottomed on their respective surfaces. Pressurized fluid is now simultaneously directed to the support assemblies 16 and 17, located on the left-hand side of the trailer 11. It should be appreciated that this movement is also utilized merely to remove small misalignments between a component and supporting structure. Accordingly any small increase in lateral distance between the new and old positions of the bearings 38 is quite small and is readily absorbed by the flexibility of the system. In this respect the flexibility of the support assemblies 16 and 17 is quite adequate to accommodate a rolling action of approximately ten degrees (10°), that is five degrees (5°) either side of their true vertical positions.

Accordingly it will be seen that a light weight trailer has been disclosed allowing lateral, longitudinal, roll, pitch and yaw movements to be imparted to components supported thereon and which, when utilized in the manner discussed above, requires only a simple component handling fixture or may be utilized without a component handling fixture.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In a transportation trailer, the combination comprising: a plurality of elongated components each having a longitudinal axis; said elongated components having an assembled relation in which they define a frame assembly of rectangular configuration having fore and aft ends and in which the axes of said components are located in a common plane; block means mounted at the corners of said frame assembly for bi-directional linear movement in a lateral direction with respect to said frame assembly; load supporting members mounted in each of said block means; one of said load supporting members having a fixed relation in the block means in which it is mounted; the remainder of said load supporting members having a movable relation in the block means in which they are respectively mounted; the remainder of said load supporting members including locking means having locked and unlocked positions securing them in fixed relation in said respective block means and allowing pivotal movement therein in planes normal to said common plane in fore and aft directions with respect to said frame assembly; and means adapted to impart said linear movement to said block means.

2. In a transportation trailer, the combination as set forth in claim 1: in which said means for imparting linear movement to said block means comprises first structure adapted to simultaneously impart movement to said block means located at one end of said frame assembly either to the right or left of said frame assembly and second structure adapted to simultaneously impart movement to said block means located at the other end of said assembly either to the right or left of said frame assembly.

3. In a transportation trailer, the combination as set forth in claim 2: in which said load supporting members comprise elongated extendable and retractable members terminating in spherical ends; the spherical end of said one load supporting member constituting fixed structure functioning to maintain equipment mounted thereon in a fixed relation laterally and longitudinally with respect to said frame assembly; and means for extending and retracting said load supporting members.

References Cited by the Examiner

UNITED STATES PATENTS

| | | | |
|---|---|---|---|
| 135,771 | 2/73 | Burtch | 254—133 X |
| 945,334 | 1/10 | Lent | 254—133 X |
| 1,410,103 | 3/22 | Lightner et al. | |
| 1,877,364 | 9/32 | Schoenberg. | |
| 2,545,953 | 3/51 | Hall. | |
| 2,896,909 | 7/59 | Taylor. | |
| 2,931,519 | 4/60 | Beach. | |
| 3,120,316 | 2/64 | Luchford | 214—394 |

HUGO O. SCHULZ, *Primary Examiner.*